V. L. EMERSON.
APPARATUS FOR THE CONVERSION OF HYDROCARBON OILS.
APPLICATION FILED MAY 6, 1920.

1,367,806.

Patented Feb. 8, 1921.

Inventor
Victor Lee Emerson.
By Laurence S. Paddock
Attorney

UNITED STATES PATENT OFFICE.

VICTOR LEE EMERSON, OF PHILADELPHIA, PENNSYLVANIA.

APPARATUS FOR THE CONVERSION OF HYDROCARBON OILS.

1,367,806.  Specification of Letters Patent.  Patented Feb. 8, 1921.

Application filed May 6, 1920. Serial No. 379,356.

*To all whom it may concern:*

Be it known that I, VICTOR LEE EMERSON, a citizen of the United States, residing at Philadelphia, county of Philadelphia, and State of Pennsylvania, have invented certain new Improvements in Apparatus for the Conversion of Hydrocarbon Oils, of which the following is a specification.

While this invention relates broadly to distillation and conversion of complex chemical combinations into new atomic groups, it relates more specifically to a process for the conversion of heavy hydrocarbon oils into lighter hydrocarbon oils. A copending application Serial Number 379,358, filed simultaneously with this one, relates to a process, the apparatus of which is claimed in this application.

It is an object of my invention to eliminate the impurities in the oil, such as sulfur and water and similar compounds to prevent them from forming objectionable combinations in the still, such as carbon bisulfid, and to prevent the elements of oxygen and hydrogen contained in any water present in the oil from forming explosive compounds by uniting with the carbonaceous vapors or gaseous products in the still. Heretofore oil stills have usually been fed directly with the oil without previously treating the same so that the impurities or foreign matter referred to are removed, which often results in the destruction of the still or serious interference with the operation of the process. Violent explosions have taken place where there was apparently little pressure on the still. These are apparently due to the result of a quantity of water or moisture being fed to the still while it is at a high temperature. Sulfur also accompanies the oil in many places. The oxygen of the water, combining with the carbonaceous gases, forms chemical combinations in which combustion takes place, rapidly supported by the hydrogen contained in the water and the sulfurous gases present, resulting in violent explosions.

With the present apparatus, these dangers are entirely avoided as the contained water and sulfur compounds and other impurities are removed prior to the introduction of the oil into the still. It is an object of the present invention to provide for the removal of impurities or foreign compounds from the oil prior to the admission of the same into the still.

It is a further object of the present invention to utilize the heat in the gaseous products coming from the still to preheat the oil before it is pumped into the still. This results in the evaporation of any water held in suspension and removes any sulfurous compounds that might enter into combination with either the oil, water, or gaseous products. At the same time, a portion of the heavier products coming over in gaseous form from the still, are condensed by contact with a body of oil which is at a lower temperature and conversely the readily vaporizable material in the body of oil is transformed into vapor by the heat transmitted to the same from the gaseous products brought in contact therewith.

It is likewise an object of my invention to subject the heavier oil to the action of impact and the heat of the gaseous products from the still, and to combine the same with such products from the still as are condensed on contact with the body of oil at a lower temperature. The preheated and pretreated oil and condensates are injected into the material contained in the still and are subjected to a cracking reaction by reason of the higher temperature of the material into which they are injected.

It is obvious that the material into which they are injected is at a higher temperature than the material injected. This is due to the fact that the material in the still has been robbed of the lower boiling oils by distillation.

In operation, the hydrocarbons having a relatively low boiling point, are subjected to the heat of the residual hydrocarbons undergoing treatment under high pressure and temperature which have a high boiling point. The supply of low boiling hydrocarbons to the high boiling hydrocarbons in the still not only utilizes the temperature and heat of the high boiling hydrocarbons to cause a cracking reaction of the lower boiling hydrocarbons, but the low boiling hydrocarbons, when intermixed with the high boiling hydrocarbons, act to maintain the entire mixture in such a state as to avoid the formation of hard carbon and free gas by excessive cracking due to the extreme temperatures accompanying a reduction of the distillate to a high boiling point. This action is present to a large extent in the ordinary processes.

It is a still further object of my invention to utilize the pressure and heat of the gases as they come from the still to give a high velocity to the gaseous products from the still sufficient to cause molecular dissociation on concussive impact either of the gaseous products themselves or in combination with the oil. The molecular dissociation produces a condition inducive to the formation of new atomic groups and the production of a product of lighter gravity and lower boiling point.

Before proceeding to describe the apparatus in detail, I deem it best to explain certain theories which I believe are involved in my apparatus, but I do this merely in order that those skilled in the art may more clearly appreciate its peculiar characteristics and may consequently apply it in practical use. I wish it to be understood that the patentable novelty of my apparatus does not depend upon the scientific accuracy of the theories advanced. The theories are given by way of explanation of the phenomena occurring in operation. While not limiting myself to any one theory or hypothesis, it would appear that the high velocity of the expanded gaseous products from the still, and fluid intermixed therewith, give rise to a molecular attrition of extreme violence at the point of impact. A large amount of heat is also liberated at the point of impact. The attrition caused by impact aids at this point to reduce the masses to very fine particles which renders them practically susceptible to chemical dissociation due to the action of the various phenomena attendant upon impact. One of the phenomena attendant upon impact, which I believe aids in the chemical dissociation, is that of ionization. The friction attendant upon attrition at the point of impact sets up an electrical effect which causes the ionization. The heat liberated at the point of impact has its well known function of aiding the chemical action, and is thereafter utilized to preheat the oil in the cycle of operation. The cracking decomposition of organic compounds by heat is explained on the basis of the occurrence of inter-molecular collisions of such violence that the bonds holding together the various atoms or groups are ruptured. The degree of cracking varies as the temperature to which the substance is heated. The shock of concussive impact also sets up violent molecular vibrations which cause intermolecular collisions similar to the action of heat which cause dissociation at the point of impact. All these phenomena are attendant upon impact and are inducive to the chemical dissociation herein set forth. It is sufficient to say that, due to such effects as these, a molecular arrangement is produced and new atomic groups are formed and a very large proportion of the lighter and simple hydrocarbons result from this reaction.

The preheating of the hydrocarbon mass causes the hydrocarbons to approach the point of impact in a heated state and consequent readiness to be cracked by the action of impact and its attendant phenomena. In obtaining this dissociation by impact and its attendant phenomena, there is an absence of the surrounding pressure which would otherwise be essential were it to be carried out in a confined chamber under heat.

It will be apparent that the gaseous products and liquid hydrocarbons are rapidly subjected to temperature changes. The gaseous products, on reaching the jets, have been cooled by expansion, thereafter they are heated by impact and are again cooled by being brought in contact with the liquids which are maintained at a lower temperature than the gaseous products. The liquids are raised in temperature by intermixture with the gaseous products from the still and undergo temperature changes along with these gaseous products. The constant rapid change of temperature aids the dissociation of the hydrocarbon molecules by subjecting them to repeated and sudden changes in stress due to temperature changes, which tend to overcome their chemical inertia. Thus, the molecular dissociation of the high boiling heavy hydrocarbon oils is accomplished in a manner which avoids a temperature productive of a pressure which would be destructive to the containing vessel in the ordinary apparatuses.

The term "attrition" is used in the description of the reaction taking place on impact, but it should be understood that this term not only covers a mechanical attrition but a molecular and atomic attrition as well in the present instance.

Other objects and advantages of the invention will appear hereinafter.

In order to render my present invention clear, reference is had to the accompanying drawings in which—

Figure 1:
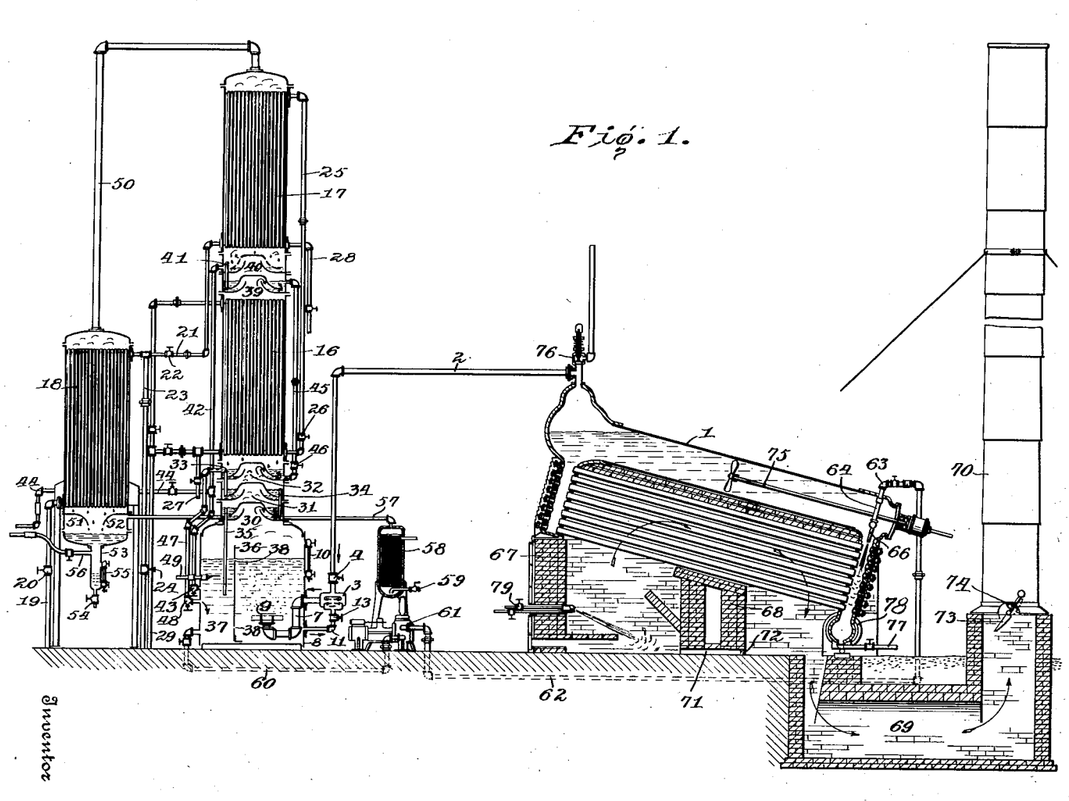
Figure 1 is a vertical section of one form of apparatus adapted for carrying out the conversion of hydrocarbon oils.

In the apparatus disclosed in Fig. 1, I employ a still shown at 1. While it is within the scope of my invention to employ various types of stills, I prefer to use the type which is herein shown, being the type of still shown in my Patent No. 1,337,831, granted April 20, 1920, with certain modifications as will hereinafter appear. While my apparatus is capable of being operated through a wide range of temperatures and pressures, and the details of the apparatus are capable of variation within the scope of my invention which is not limited to the particular temperatures, pressures or details mentioned or disclosed, the following is an example of an apparatus used in a particular instance. While my apparatus is adapted to the conversion of hydrocarbon oils broadly, I find that satisfactory results, when operating on fuel oil, will be obtained by the use of a pressure in the still of 75 to 100 pounds per square inch with an accompanying temperature of seven hundred to eight hundred degrees Fahrenheit. With this temperature and pressure, a cracking reaction will take place with the attendant formation of gaseous products.

Figure 2:
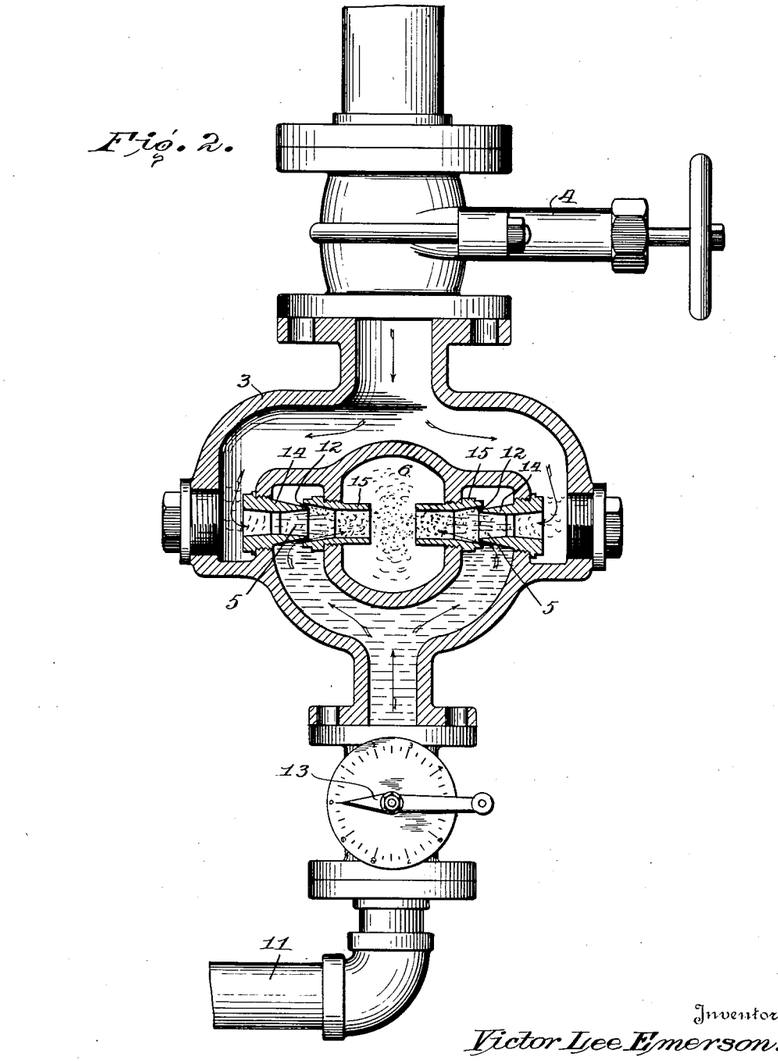
Fig. 2 is a view partly in section of the jet apparatus which I employ in my process.

In order to impart the kinetic energy to the impacting masses necessary to the carrying out of my process, I find that satisfactory results will be obtained by the use of a high velocity jet apparatus, such as shown in Fig. 2. The jet apparatus shown in Fig. 2 on the drawing filed herewith, is one-third actual size of that employed by me in a commercial apparatus. With this jet apparatus and the pressures and temperatures herein set forth the velocity attained will be of a very high order and by test has been shown to be approximately 3870.44 feet per second. The gaseous products under pressure are passed from the still 1 by means of a pipe 2 to the jet apparatus illustrated at 3. The flow of gaseous products to the jet apparatus is controlled by a valve 4 in the pipe 2. In the jet apparatus 3 the gaseous products are subjected to expansion at the points 5. These jets as stated are so designed as to produce a high velocity of the gaseous products on expansion. The gaseous products are caused to mutually impinge upon one another in the reaction chamber 6. From the reaction chamber 6, a pipe 7 leads into the receptacle 8 and is provided at its end with a perforated head 9. The receptacle 8 contains a hydrocarbon oil whose level is indicated on a sight gage 10. A pipe 11 leads from the lower portion of the receptacle 8 to the lower portion of the jet apparatus and is adapted to conduct the liquid in the receptacle 8 to the jets, as shown at 12 in the manner indicated by arrows on Fig. 2. In the pipe 11 is placed a valve 13, provided with an indicating pointer and dial for the purpose of regulating the flow of liquid from the receptacle 8 to the jets. The jets are formed as shown in Fig. 2 in such a manner that the liquid from the receptacle 8 is intermixed with the energized gaseous products from the still after they have been given a high velocity by expansion. The jets as shown comprise two members 14 and 15. The member 14 is an expansion jet, as shown. The liquid from the receptacle 8 is drawn into the nozzle 15 by the gaseous products under velocity issuing from the jet 14, and is carried with the energized gaseous products into the reaction chamber 6, wherein the gaseous products and entrained liquid are subjected to mutual impact. While I have herein shown an apparatus employing opposed jets, it is to be understood that my process can be carried out by other means which will give the desired impact and, if so desired, I may cause the energized masses to impact against a stationary member. While in the present instance I have disclosed a means for producing the desired impact by an apparatus which utilizes the energy of heat expansively in a high velocity jet apparatus as one way of producing the desired impact, such other means may take the form of any apparatus capable of imparting the required velocity necessary to the desired impact.

While the operation can be carried out by the impact of the gaseous products alone, it is found desirable to introduce the liquid from the receptacle 8 into the reaction as described. The liquid particles aid in increasing the action of impact by mutual impact with the gaseous products and are subject to dissociation themselves, due to the action of impact. The friction caused by the attrition of the mutually impacting masses is inductive to the formation of static electricity with its consequent ionizing effect.

During the cracking distillation occurring in the still 1, a portion of the gaseous products are cracked, while other portions remain uncracked. These gaseous products are subjected to the action of impact by means of the jet apparatus 3, with the result that the gaseous products are subjected to dissociation on impact and the uncracked gaseous products from the still likewise undergo dissociation. In this manner, the gaseous products from the still and the liquid from the receptacle 8, are subjected to dissociation which results in new atomic groups and a product of lighter gravity and lower boiling point.

The products of distillation which come over from the still include true gases, such as hydrogen, vapors, saturated vapors and gases, and particles of the material undergoing distillation which remain in the liquid form and are held in suspension by the gaseous products. I use the term "gaseous products" to cover all the material coming over from the still as described.

In the preliminary steps of operation, the valve 13 in the pipe 11 is so regulated that a large quantity of liquid is admitted to the chamber in communication with the jets. After the liquid in the receptacle 8 is heated to the desired point, the quantity of liquid admitted to the jets is so reduced by means of the valve 13 that the velocity of the jets, which is retarded by the large quantity admitted as described, is increased to a point sufficient to create the desired reaction in the chamber 6. The liquid partakes of the velocity of the jets, and being mixed with the energized gaseous products, is subjected to mutual impact with them. The gaseous products of impact pass from the perforated head 9 through the fluid in the receptacle 8 as indicated in the form of bubbles in the drawing. Those portions of the gaseous products of impact which are condensable at the temperature at which the liquid in the receptacle 8 is maintained, are condensed. Those gaseous products of impact which are not condensed, pass upwardly through a series of condensers and traps hereinafter described.

A primary condenser is illustrated at 16, a secondary condenser at 17 and a final condenser at 18. In the particular embodiment of my invention shown, I employ three condensers as described, but it is to be understood that it is within the scope of my invention to vary the number of condensers according to the result desired. The final condenser 18 is supplied with water as a temperature-maintaining medium by the pipe 19 controlled by the valve 20. The water, after having passed upwardly through the condenser, is conducted by the pipe 21 to the base of the condenser 17. The flow of water in the pipe 21 is controlled by the valve 22. A by-pass for the water is provided by the pipe 23 in which is placed a valve 24. It is desirable in this embodiment of my invention to keep the temperature of the condenser 17 at or about the boiling point of water. The steam formed in the condenser 17 is conducted by the pipe 25 to the base of the condenser 16, and maintains the temperature of the condenser 16 at the desired point. A valve 26 is placed in the pipe 25. It will thus be seen that the temperature-maintaining means employed by me employs a cycle of operation in which a vaporizable fluid is caused to maintain the temperature of the final condenser, thereafter is converted into vapor in a secondary condenser and the vapors thereof, thus produced, are caused to maintain the temperature in a primary condenser. The various temperatures at which the condensers are maintained are regulated so that they correspond to the condensing temperature of the product which it is desired to condense.

For the purpose of obtaining the desired temperature of the condensers during the preliminary stage of operation, steam is fed to the condensers by pipes 27 and 28. The pipes 27 and 28 are provided with valves as shown. The waste steam is led away through the pipe 29. Beneath the primary condenser 16 is shown a series of traps, indicated by the numerals 30, 31 and 32. The traps 31 and 32 are connected by stand pipes 33. The traps 30 and 31 are connected by stand pipes 34. The trap 30 is connected with the receptacle by a pipe 35 which extends downwardly into the liquid in the receptacle 8. A partition 36 is placed in the receptacle 8 which divides off a portion of the liquid therein and forms a chamber 37, as shown. The pipe 35 extends into the chamber 37. The partition 36 is provided with apertures 38 for the purpose of equalizing the liquid level in the receptacle 8. Between the primary condenser 16 and the secondary condenser 17 are placed the traps 39 and 40. The trap 39 is connected with the trap 40 by stand pipes 41. A pipe 42 connects the trap 40 with the receptacle 8. A valve 43 is placed in the pipe 42 so as to control the fluid passing into the chamber 37 of the receptacle 8. A pipe 44 is connected to the pipe 42. A valve is placed in the pipe 44. The pipe 44 leads to a storage or run-down tank, not shown. The trap 39 is connected to the trap 32 by a pipe 45. A valve 46 is placed in the pipe 45. A pipe 47 connects the upper trap 32 with the chamber 37 of the receptacle 8. A valve 48 is placed in the pipe 47. A supply of fresh oil is conducted into the chamber 37 of the receptacle 8 by a pipe 49. It is desirable to place a check valve in the pipe 49, as shown. The condensers 17 and 18 are connected by a pipe 50. The final condenser 18 is provided with a chamber 51 at its base in which is placed a plate 52 acting to guide the condensates through an aperture therein to the lower part of the chamber 51. A trap 53 is provided with a valve-controlled outlet 54 and a level gage 55. From the upper portion of the trap 53, a pipe 56 leads to a storage or run-down tank, not shown. The gage 55 indicates the level of water or other liquid impurities which collect in the trap 53. From the chamber 51 a gas conducting pipe 57 leads to a condensing apparatus 58. The condensing apparatus 58 is provided with a valve-controlled outlet 59. From the chamber 37 of the receptacle 8, a pipe 60 leads to a pump 61. In the present instance the pump is illustrated as steam driven, but it is obvious that it may be driven by any suitable power. The pump 61 discharges through a pipe 62 into the rear header of the still 1, as shown at 63. In order to use the incoming fluid to cause a circulation in the still 1, I have provided a jet apparatus indicated by the numeral 64. This jet apparatus is composed of a spreader pipe 65, which is provided with a series of nozzles 66. The nozzles 66 project downwardly between the partitions of the rear header and serve to impel the liquid undergoing distillation by the force of the incoming jets.

This causes a rapid circulation of the fluid in the still. As will be seen, the fluid passing through the jets is injected into the fluid under distillation so as to cause a uniform circulation.

The type of still which I have shown is provided with an oil-burning furnace indicated at 67. I find it desirable to direct the flame of the burner downwardly, as shown, so that the heat therefrom will be conducted to the tubes by radiation, rather than by direct contact therewith. I find this assists in avoiding over-cracking of the oil due to excessive localized heat and results in a more even distribution of the heat. A partition 68 is so placed that the gases of combustion are caused to pass from the upper end of the tubes along their length, and thence downwardly through the pit 69, from whence they escape through the stack 70. The partition 68 is so constructed as to form a passage 71 at the bottom thereof. This passage is normally obstructed by a brick or bricks indicated at 72. If it should happen that from any cause the tubes or other portion of the still should be so destroyed as to allow an escape of the oil therein, the oil would push the brick or bricks 72 out of the passage 71, and the oil would fill the pit 69, thus forming a liquid seal in such a manner as to cut off the draft. This effectually stifles the conflagration which would follow if the draft were not shut off.

In the base of the stack 70 is placed a weighted valve 73 which is held in open position by a plug 74, of such material as will be affected by excessive heat to destroy the function thereof. I find that a plug of wood in this position satisfactorily performs the desired function, although other temperature-responsive material might be used. If the temperature of the gases of combustion passing through the stack becomes so great as to destroy the plug, the weight on the valve will cause the valve to close off the draft, thereby reducing the temperature of the still below the danger point.

Figure 3:
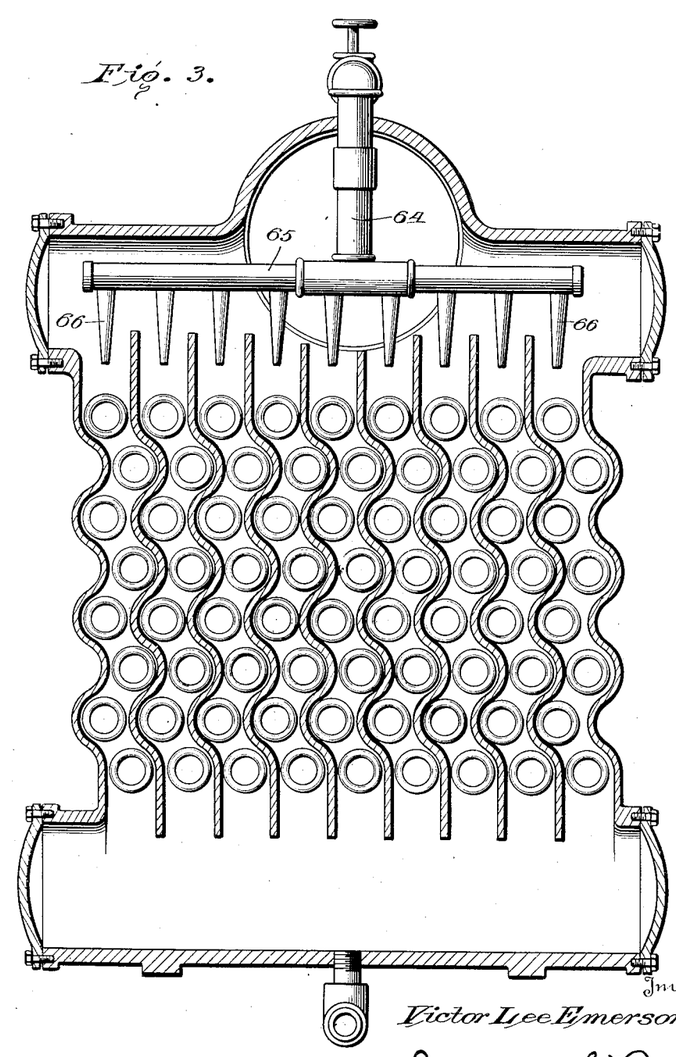
Fig. 3 is a vertical section of the rear header of the still shown in Fig. 1, illustrating in particular the liquid impelling apparatus.

When operating with viscous material, it is desirable to use a mechanical propelling device, such as a propeller which I have shown at 75 in combination with the jets 66. When this is done, the pipe connections to the jet apparatus 64 which will be so formed as to permit of the proper location of the driving means for the propeller. It may be found desirable to use either the propeller or the jets alone in certain instances. A safety valve 76 is located in the pipe line 2 to relieve any dangerous pressure in the still. A drain pipe, shown at 77, permits the removal of the residues which collect in the drum or trap 78. A fuel burner, is so designed as to direct the flame downwardly in the furnace 67, as shown.

The operation of the above described embodiment of my invention, is as follows:

In the preliminary stages of operation, the oil to be treated is admitted through the pipe 49 until it fills the receptacle 8 and the still 1 to the desired level. During this operation the pump 61 may be used to force the oil into the still through the pipe 62 and jet apparatus 64. At this time the oil in the receptacle 8 will equalize its level through the openings 38 in the partition 36. The oil being at the desired level, the furnace is set in action. When the gaseous products produced in the still, reach a pressure sufficient to cause a satisfactory flow through the pipe 2 and jet apparatus to draw the liquid up through the pipe 11, the valves 4 and 13 are opened. At this time the valve 13 is opened wide enough to cause a large quantity of oil to be drawn into the jets. The oil in the receptacle 8 is repeatedly circulated through the jets and by this treatment is heated. When the oil in the receptacle 8 is heated to the desired point, the flow to the jets through the pipe 11 is cut down by the valve 13 to a point such as will permit the gaseous products intermixed with the oil, to attain a velocity sufficient to cause the desired force of impact in the reaction chamber 6 for the conversion of the impacting masses. The products of impact pass through the pipe 7 and perforated head 9 into the oil in the receptacle 8. Here the gaseous products give up heat to the oil and maintain the temperature thereof at the desired point. The temperature of the oil in the receptacle 8 is maintained at such a degree as will vaporize any impurities therein, such as water and sulfur compounds. Such of the gaseous products issuing from the head 9 as are condensable at the temperature at which the oil in the receptacle 8 is maintained, will be condensed by contact with said oil. The addition of condensates thus formed to the oil in the receptacle 8, causes a flow through the openings 38 in the partition 36 into the chamber 37. The fresh oil entering the chamber 37 is at a lower temperature than the oil on the opposite side of the partition 36. A heat transference therefore takes place between the oil on opposite sides of the partition 36. This heat transference, coupled with the loss of heat by vaporization, keeps the temperature of the oil in the receptacle 8 below that of the gaseous products issuing from the head 9. By reason of this heat transference, the fresh oil in the chamber 37 is partially robbed of its lower boiling constituents and such impurities as are vaporizable, such as water and sulfur compounds, the vapor of which mingles with the gaseous products which collect over the surface of the oil in the receptacle 8, are removed. The mixture of the gaseous products and vaporized foreign material passes up through the traps 30, 31 and 32, thence through the condenser 16, traps 39 and 40, condenser 17, pipe 50 and final condenser 18, wherein said mixture is acted upon by the successively decreased temperature of the successive zones of temperature formed by said traps and condensers. As heat is progressively extracted from the gases, the temperature of the progressive zones is automatically maintained on a progressively decreasing scale. The condensates from the condensers 16 and 17 descend so as to fill the traps 30, 31, 32, 39 and 40 to the level shown, which is controlled by the height of the stand pipes, as shown. The pipe 42 enters the trap 40 at a point below the top of the stand pipes 41. When the valve 43 is opened to pass the condensates in the trap 40 to the chamber 37 in the receptacle 8, the level in the trap is brought below that of the top of the stand pipes 41, so that the condensates in the trap 40 are not passed to the trap 39. Conversely, when the valve 43 is closed or so regulated that the condensates do not flow through the pipe 42 as rapidly as they are collected in the trap 40, the condensates in the trap 40, or a portion thereof, pass to the trap 39. A pipe 45 allows the condensates in the trap 39 to pass to the trap 32. The flow of condensates through the pipe 45 is controlled by the valve 46. The condensates in the trap 32 may pass both by the stand pipes 33 to the trap 31 and by the pipe 47 to the chamber 37. The flow of condensates through the pipe 47 is controlled by the valve 48. The condensates from the trap 31 pass to the trap 30 through the stand pipes 34. From the trap 30 the pipe 35 conducts the condensates to the chamber 37 as shown. The mixture of gaseous products and vapors pass successively through the condensates in the several traps, and as the condensates are maintained at successively decreased temperatures, those constituents of the gases and vapors will be condensed which are condensable at the temperature at which the condensates in the several traps are maintained. The temperature of the condensers 16, 17 and 18 is maintained at a point which will condense the constituents of the gaseous products which form the desired products. It will be seen that by opening the valve 43, such portion of the condensates in the trap 40 as it is desired to mix with the contents of the chamber 37 may be passed thereto. By opening the valve 46, condensates from the trap 39 may be passed into the trap 32, and by opening the valve 48, condensates from the trap 32 may be passed to the chamber 37. A final product is conducted through the pipe 44 to a run-down tank not shown. The condensates from the final condenser 18 collect in the chamber 51 in the base thereof and are drawn off by a pipe 56. The pipe is bent upward so as to cause the level of the condensates in the chamber 51 to correspond to the level of the highest portion of the pipe, as shown. The temperature of the condenser 18 is maintained below the boiling point of water and, consequently, the water vapor and volatilized sulfur compounds carried over with the hydrocarbon gaseous products will be condensed and settle in the trap 53, and may be drawn off by the valve 54. The sight gage 55 indicates the level of these impurities so that they may be drawn off before reaching to too great a height in the trap 53. Any fixed or non-condensed gases in the chamber 51 will pass off through the pipe 57 to the condenser 58. The condensates from the condenser 58 may be drained off through the pipe 59. The condensates drawn off by the pipe 56 form a final product of lighter gravity than those drawn off through the pipe 44. It will be readily understood that the gravity of the final products may be varied by suitable regulation of the temperature used and treatment to which they are subjected. The several condensers and traps will be maintained at temperatures known to condense the desired products.

To facilitate the description, I will refer to the apparatus to the left of Fig. 1 to which the gaseous products from the still 1 are delivered, as the primary still, and the still 1 as the secondary still, since the oil is first treated to partial distillation in the chamber 37 of the receptacle 8 and to a further distillation in the still 1. The pump 61 draws the oil from the chamber 37 by the pipe 60 and forces it under pressure into the material undergoing distillation in the still 1, by way of jet apparatus 64. The jets 66 deliver the oil with great velocity downwardly into the passages between the partitions of the rear header, as shown in Fig. 3, thereby producing a rapid circulation of the oil undergoing distillation. This rapid circulation produces an even temperature throughout the oil and reduces the formation of hard carbon and free gas due to over-cracking.

Thus is produced a continuous cycle of operation.

Those condensates which are delivered to the chamber 37 are fed to the secondary still along with the preheated and predistilled fresh oil. The admixture of the condensates and preheated and pretreated oil with the material undergoing distillation in the secondary still, keeps said material in the still at a temperature which reduces to a large extent, the formation of hard carbon and free gas due to over-cracking at excessive temperatures. The injected material is also subjected to a cracking reaction by reason of the higher temperature of the material in the still whose boiling point has been raised, due to the loss of lower boiling oils therefrom in the process of distillation.

In carrying out the operation, the water vapor present may enter into the action taking place in the reaction chamber, a hydrogenating effect taking place. If desired, water could be added to the heavy oil in the receptacle or directly to the jets, in order to increase a hydrogenating effect. Hydrogen gas could also be admitted in the same manner and for the same purpose.

While this particular embodiment of my invention has been described with reference to the treatment of petroleum for the production of lighter hydrocarbons, it is of course to be understood that my apparatus is equally applicable to chemicals other than hydrocarbons. It is also to be understood that other conditions and reactions than those described may be present in the operation of my apparatus and come within the scope of the appended claims.

What I claim is:

1. In an apparatus for the conversion of hydrocarbon oils, the combination of means for imparting sufficient kinetic energy thereto to cause dissociation thereof by concussive impact, and means for subjecting said oils to such impact.

2. In an apparatus for the conversion of hydrocarbon oils, the combination of means for imparting sufficient kinetic energy thereto to cause dissociation by concussive impact, and means for separating and collecting the products of impact.

3. In an apparatus for the conversion of hydrocarbon oils, the combination of a still operable under pressure, a chamber adapted to receive the gaseous products of distillation from said still and means for introducing said products into said chamber and subjecting the same to sufficient concussive impact to cause dissociation thereof.

4. In an apparatus for the conversion of hydrocarbon oils, the combination of a still operable under pressure, means adapted to receive the gaseous products of distillation from said still, and means for intermixing with said gaseous products a liquid mass of oil and subjecting the mixture thus formed to impact.

5. In an apparatus for the conversion of hydrocarbon oils, the combination of a still operable under pressure, an oil receptacle, means for intermixing with the gaseous products of distillation from the still a mass of oil from said receptacle, and subjecting the mixture thus formed to impact, and means for introducing the products of impact into the oil in said receptacle.

6. In an apparatus for the conversion of hydrocarbon oils, the combination of a still operable under pressure, an oil receptacle, means for intermixing with the gaseous products of distillation from the still a mass of oil from said receptacle and subjecting the mixture thus formed to impact, means for introducing the products of impact into the oil in said receptacle, and means connected with said receptacle for separating and collecting the products thus formed.

7. In an apparatus for the conversion of hydrocarbon oils, the combination of a still operable under pressure, an oil receptacle, means for intermixing with the gaseous products of distillation from the still a mass of oil from said receptacle and subjecting the mixture thus formed to impact, means for introducing the products of impact into the oil in said receptacle, and condensing means connected to said receptacle for separating and liquefying the volatile products therefrom.

8. In an apparatus for the conversion of hydrocarbon oils, the combination of a still operable under pressure, a jet apparatus connected thereto so as to receive the gaseous products of distillation from said still, said jet apparatus comprising a plurality of opposed jets adapted to cause mutual impact between separate masses of the gaseous products of distillation.

9. In an apparatus for the conversion of hydrocarbon oils, the combination of a still operable under pressure, a jet apparatus connected thereto so as to receive the gaseous products of distillation from said still, said jet apparatus comprising a plurality of opposed jets adapted to cause mutual impact between separate masses of the gaseous products of distillation, a casing surrounding said jets, an oil receptacle, and a conduit connecting said casing and receptacle adapted to convey the products of impact into the oil in said receptacle.

10. In an apparatus for the conversion of hydrocarbon oils, the combination of a still operable under pressure, a jet apparatus connected thereto so as to receive the gaseous products of distillation from said still, said jet apparatus comprising a plurality of opposed jets adapted to cause mutual impact between separate masses of the gaseous products of distillation, a casing surrounding said jets, an oil receptacle, a conduit connecting said oil receptacle and casing adapted to convey the products of impact into the oil in said receptacle, a second conduit connecting said casing with said receptacle adapted to convey oil from said receptacle to said jets so as to be mixed with the gaseous products passing therethrough, and means for controlling the flow of fluids through said conduits.

11. In an apparatus for the conversion of hydrocarbon oils, the combination of a still operable under pressure, means connected thereto so as to receive the gaseous products of distillation from said still and adapted to subject said gaseous products to impact, an oil receptacle, a conduit connecting said means with said receptacle so as to deliver the products of impact into the oil therein, a condensing means connected with said receptacle adapted to condense the gaseous products therefrom, a chamber within said receptacle adapted to receive condensates from said condensers, means for conducting condensates from said condensers to said chamber, and means for delivering the condensates in said chamber into the material undergoing distillation in said still.

12. In an apparatus for the conversion of hydrocarbon oils, the combination of a still operable under pressure, means connected thereto so as to receive the gaseous products of distillation therefrom and adapted to subject said gaseous products to impact, an oil receptacle, a conduit connecting said means with said receptacle so as to deliver the products of impact into the oil therein, a condensing means connected with said receptacle adapted to condense the gaseous products therefrom, said receptacle being provided with a chamber adapted to receive condensates from said condensers, means for conducting condensates from said condensers to said chamber, means for supplying fresh oil to said chamber, and means for delivering the mixture of condensates and fresh oil from said chamber into the material undergoing distillation in said still.

13. In an apparatus for the conversion of hydrocarbon oils, the combination of a still operable under pressure, means connected thereto so as to receive the gaseous products of distillation therefrom and adapted to subject said gaseous products to impact, an oil receptacle, a conduit connecting said means with said receptacle so as to deliver the products of impact into the oil therein, a second conduit connected with said means and said receptacle adapted to conduct the oil in said receptacle to the means wherein the gaseous products from the still undergo the action of impact in such a manner as to intermix the oil from said receptacle with said gaseous products and be subjected to mutual impact therewith, a condensing means connected with said receptacle adapted to condense the gaseous products therefrom, said receptacle being provided with a chamber adapted to receive condensates from said condensing means, means for conducting condensates from said condensing means to said chamber, means for supplying fresh oil to said chamber, and means for delivering the mixture of condensates and fresh oil from said chamber to the material undergoing distillation in said still.

14. In an apparatus for the conversion of hydrocarbon oils, the combination of a still operable under pressure, an oil receptacle, means for conducting the gaseous products of distillation from said still into the oil in said receptacle, said receptacle having a partition forming a chamber separated from that portion of the receptacle into which the gaseous products of distillation are delivered, said partition having apertures therein adapted to maintain a liquid level in said receptacle, means for supplying fresh oil to said chamber and means for feeding the liquid in said chamber to the material undergoing distillation in said still.

15. In an apparatus for the conversion of hydrocarbon oils, the combination of a still operable under pressure, means connected thereto so as to receive the gaseous products of distillation from said still and adapted to subject said gaseous products to impact, an oil receptacle, a conduit connecting said means for said receptacle so as to deliver the products of impact into the oil therein, a series of traps and condensers connected to said receptacle and adapted to fractionally condense the gaseous products therefrom, means for conducting a portion of the condensates from said traps and condensers to said still, and injecting them into the material undergoing distillation under pressure therein, and means for drawing off such of the condensates as are desirable as a final product.

16. In an apparatus for the conversion of hydrocarbon oils, the combination of a still operable under pressure, means connected thereto so as to receive the gaseous products of distillation therefrom and adapted to subject said gaseous products to impact, an oil receptacle, a conduit connecting said means with said receptacle so as to deliver the products of impact into the oil therein, a series of traps and condensers connected to said receptacle and adapted to fractionally condense the gaseous products therefrom, means for mixing a mass of fresh oil with the condensates from said traps and condensers, means for conducting the mixture of fresh oil and condensates to said still and injecting them into the material undergoing distillation therein, and means for drawing off such of the condensates as are desirable as a final product.

17. In an apparatus for the conversion of hydrocarbon oils, the combination of a still operable under pressure, means connected thereto so as to receive the gaseous products of distillation therefrom and adapted to subject said gaseous products to impact, a divided oil receptacle, a conduit connecting said means with said receptacle so as to deliver the products of impact into the oil in one portion thereof, a series of traps and condensers connected to said receptacle and adapted to fractionally condense the gaseous products therefrom, means for conducting fresh oil into another portion of said receptacle, means for conducting a portion of the condensates from said traps and condensers into the last named portion of said receptacle, means for conducting oil and condensates which have formed on contact of the products of impact with the oil in the receptacle to the last named portion of said receptacle, and means for conducting to said still the mixture of fresh oil, oil and condensates from the last named portion of the receptacle and injecting them into the material undergoing distillation under pressure, and means for drawing off such of the condensates as are desirable as a final product.

18. In an apparatus for the conversion of hydrocarbon oils, an oil receptacle having a vertical partition therein extending to the bottom thereof and forming separate chambers therein, means for feeding a mass of heated oils in the gaseous state into a body of oil in one of said chambers, means connected to said receptacle for fractionally condensing the gaseous products from said receptacle, means for supplying fresh oil to another chamber in said receptacle formed by said partition, means for conducting a portion of the condensates to the last named chamber, and means for drawing off such of said fractionated condensates as are desirable as a final product.

19. In an apparatus for the conversion of hydrocarbon oils, an oil receptacle having a partition therein forming separate chambers, means for feeding a mass of heated oils in the gaseous state into a body of oil in one of said chambers, a series of traps and condensers connected to said receptacle and adapted to fractionally condense the gaseous products from said receptacle, means for supplying a portion of the condensates to another chamber in said receptacle, means for supplying fresh oil to said last named chamber, and means for drawing off such of said condensates as are desirable as a final product.

20. In an apparatus for the conversion of hydocarbon oils, an oil receptacle having a partition therein forming separate chambers, means for feeding a mass of heated oils in the gaseous state into a body of oil in one of said chambers, a series of traps and condensers connected to said receptacle and adapted to condense the gaseous products therefrom comprising successively a series of connected traps, a primary condenser, a second series of connected traps, a secondary condenser and a final condenser, means for conducting condensates from said traps and primary and secondary condensers to a second chamber in said receptacle, means for supplying fresh oil to said second chamber, and means for drawing off such condensates as are desirable as a final product.

21. In an apparatus for the conversion of hydrocarbon oils, an oil receptacle, a series of traps mounted on said receptacle and in communication therewith, a primary condenser mounted on said series of traps, a second series of traps mounted over said primary condenser, a secondary condenser mounted over said second series of traps, a series of stand pipes connecting the individual traps of said series and adapted to control the liquid level therein, a valve controlled pipe connecting the upper trap of the second series with the receptacle, and a pipe adapted to conduct the oil from the trap adjacent said receptacle into said receptacle.

22. In an apparatus for the conversion of hydrocarbon oils, an oil receptacle, a series of traps mounted on said receptacle and in communication therewith, a primary condenser mounted on said series of traps, a second series of traps mounted over said primary condenser, a secondary condenser mounted over said second series of traps, a series of standpipes connecting the individual traps of said series and adapted to control the level of liquid therein, a valve controlled pipe connecting the lower trap of the second series with the upper trap of the first series, and a pipe adapted to conduct the oil from the trap adjacent said receptacle into said receptacle.

23 In an apparatus for the conversion of hydrocarbon oils, an oil receptacle, a series of traps mounted on said receptacle and in communication therewith, a primary condenser mounted on said series of traps, a second series of traps mounted over said primary condenser, a secondary condenser mounted over said second series of traps, a series of stand pipes connecting the individual traps of said series and adapted to control the level of liquid therein, a valve controlled pipe connecting the upper trap of the first series with the receptacle, and a pipe adapted to conduct the oil from the trap adjacent to said receptacle into said receptacle.

24. In an apparatus for the conversion of hyrocarbon oils, an oil receptacle, a series of traps mounted on said receptacle and in communication therewith, a primary condenser mounted on said series of traps, a second series of traps mounted over said primary condenser, a secondary condenser mounted over said second series of traps, a series of stand pipes connecting the individual traps of said series and adapted to control the level of the liquid therein, a valve controlled pipe connecting the upper trap of the second series with the receptacle, a valve controlled pipe connecting the lower trap of the second series with the upper trap of the first series, a valve controlled pipe connecting the upper trap of the first series with the receptacle, and a pipe adapted to conduct the oil from the trap adjacent to said receptacle into said receptacle.

25. In an apparatus for the conversion of hydrocarbon oils, an oil receptacle, a series of traps mounted on said receptacle and in communication therewith, a primary condenser mounted on said series of traps, a second series of traps mounted over said primary condenser, a secondary condenser mounted over said second series of traps, a series of stand pipes connecting the individual traps of said series and adapted to control the level of the liquid therein, a valve controlled pipe connecting the upper trap of the second series with the receptacle, a valve controlled pipe connecting the lower trap of the second series with the upper trap of the first series, a valve controlled pipe connecting the upper trap of the first series with the receptacle, a pipe adapted to conduct the oil from the trap adjacent to said receptacle into said receptacle, and a drain pipe connected to the pipe between the upper trap of the second series and the receptacle.

26. In an apparatus for the conversion of hydrocarbon oils, an oil receptacle, a series of traps mounted on said receptacle and in communication therewith, a primary condenser mounted on said series of traps, a second series of traps mounted over said primary condenser, a secondary condenser mounted over said second series of traps, a series of stand pipes connecting the individual traps of said series and adapted to control the level of the liquid therein, a valve controlled pipe connecting the upper trap of the second series with the receptacle, a valve controlled pipe connecting the lower trap of the second series with the upper trap of the first series, a valve controlled pipe connecting the upper trap of the first series with the receptacle, a pipe adapted to conduct the oil from the trap adjacent to said receptacle into said receptacle, a drain pipe connected to the pipe between the upper trap of the second series and the receptacle, a final condenser connected to said secondary condenser provided with a chamber in the base thereof, said chamber having an extension forming a trap, a drain pipe connected with said chamber, and an outlet valve connected to said trap.

27. An apparatus for the conversion of hydrocarbon oils, an oil receptacle, a series of condensers connected to said receptacle comprising intermediate condensers and a final condenser, said final condenser being provided with a chamber in the base thereof, said chamber having a gas space at the top thereof, a liquid trap in the bottom thereof, a guide plate located in said chamber and adapted to guide the condensates into said trap and a pipe connected to said upper space and adapted to relieve the gas therein.

28. An apparatus for the conversion of hydrocarbon oils, an oil receptacle, a series of condensers connected to said receptacle comprising intermediate condensers and a final condenser, said final condenser being provided with a chamber in the base thereof, said chamber having a gas space at the top thereof, a liquid trap in the bottom thereof, a guide plate located in said chamber and adapted to guide the condensates into said trap, a pipe connected to said upper space and adapted to relieve the gas therein, and a condenser connected to said gas relieving pipe.

29. In an apparatus for the conversion of hydrocarbon oils, an oil receptacle, means for feeding into the oil therein a mass of heated oils in the gaseous state, means for condensing the gaseous products from said receptacle comprising final and intermediate condensers connected to said receptacle, means for maintaining the temperature of the final condenser by a liquid in contact therewith, means for conducting said liquid from the final condenser into contact with one of the intermediate condensers, and means for bringing vapors of said liquid formed in said intermediate condenser into contact with a second intermediate condenser.

In testimony whereof I have hereunto set my hand.

VICTOR LEE EMERSON.